United States Patent
Satoh et al.

(10) Patent No.: US 11,768,370 B2
(45) Date of Patent: Sep. 26, 2023

(54) PROJECTOR, DISPLAY SYSTEM, AND MOBILE OBJECT

(71) Applicants: Yuuki Satoh, Kanagawa (JP); Kazuhiro Fujita, Tokyo (JP)

(72) Inventors: Yuuki Satoh, Kanagawa (JP); Kazuhiro Fujita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 228 days.

(21) Appl. No.: 17/425,345

(22) PCT Filed: Feb. 25, 2020

(86) PCT No.: PCT/JP2020/007508
§ 371 (c)(1),
(2) Date: Jul. 23, 2021

(87) PCT Pub. No.: WO2020/189191
PCT Pub. Date: Sep. 24, 2020

(65) Prior Publication Data
US 2022/0099968 A1    Mar. 31, 2022

(30) Foreign Application Priority Data
Mar. 18, 2019   (JP) ................................ 2019-050099

(51) Int. Cl.
*G09G 5/00*      (2006.01)
*G02B 27/01*     (2006.01)
(Continued)

(52) U.S. Cl.
CPC ..... *G02B 27/0101* (2013.01); *G02B 27/0012* (2013.01); *G03B 21/28* (2013.01)

(58) Field of Classification Search
CPC . G02B 27/0101; G02B 27/0012; G03B 21/28
(Continued)

(56) References Cited

U.S. PATENT DOCUMENTS

2004/0264006 A1* 12/2004 Hatakeyama ...... G02B 17/0663
                                                    359/726
2008/0151329 A1*  6/2008 Saiga ....................... H04N 1/03
                                                    358/494
(Continued)

FOREIGN PATENT DOCUMENTS

EP       2944986 A1    11/2015
EP     3 006 988 A1     4/2016
(Continued)

OTHER PUBLICATIONS

International Search Report dated Apr. 29, 2020 in PCT/JP2020/007508 filed on Feb. 25, 2020, 9 pages.
(Continued)

*Primary Examiner* — Thuy N Pardo
(74) *Attorney, Agent, or Firm* — XSENSUS LLP

(57) ABSTRACT

A projector includes an image forming unit configured to emit image light that forms an image and an imaging optical system configured to form an image by reflecting the image light. S magnification power at a point of the imaging optical system where the image light is incident and optical-path length between the image forming unit and the imaging optical system is short is made higher than a magnification power at a point of the imaging optical system where the image light is incident and the optical-path length between the image forming unit and the imaging optical system is long.

6 Claims, 25 Drawing Sheets

(51) Int. Cl.
G02B 27/00 (2006.01)
G03B 21/28 (2006.01)

(58) Field of Classification Search
USPC ....... 345/7, 173; 359/726, 728, 630; 348/51, 348/789
See application file for complete search history.

(56) References Cited

U.S. PATENT DOCUMENTS

| | | | |
|---|---|---|---|
| 2010/0238416 A1* | 9/2010 | Kuwata | G03B 21/28 |
| | | | 359/728 |
| 2011/0157709 A1 | 6/2011 | Togino | |
| 2011/0221781 A1* | 9/2011 | Okamoto | G01B 11/026 |
| | | | 345/660 |
| 2012/0075708 A1* | 3/2012 | Hagiwara | G02B 27/0101 |
| | | | 359/630 |
| 2012/0235883 A1* | 9/2012 | Border | G06F 3/017 |
| | | | 345/8 |
| 2013/0286264 A1* | 10/2013 | Kamikura | G03B 17/14 |
| | | | 348/789 |
| 2014/0002803 A1* | 1/2014 | Abe | G03B 21/28 |
| | | | 353/97 |
| 2015/0029140 A1* | 1/2015 | Hwang | H04N 9/3129 |
| | | | 345/173 |
| 2016/0100138 A1* | 4/2016 | Shin | G03B 21/625 |
| | | | 348/51 |
| 2017/0021235 A1* | 1/2017 | Ghods et al. | G02B 27/0179 |
| 2017/0212352 A1* | 7/2017 | Cobb | G02B 27/0179 |
| 2017/0336639 A1* | 11/2017 | Gao | G02B 27/283 |
| 2018/0143490 A1* | 5/2018 | Wakabayashi | G02B 3/0056 |
| 2019/0285884 A1 | 9/2019 | Fujita et al. | |
| 2019/0285885 A1 | 9/2019 | Satoh et al. | |

FOREIGN PATENT DOCUMENTS

| | | |
|---|---|---|
| JP | 2005-003918 | 1/2005 |
| JP | 2015-232691 | 12/2015 |
| JP | 2016-075881 | 5/2016 |
| JP | 2016-130759 | 7/2016 |
| WO | WO2018029999 A1 | 2/2018 |

OTHER PUBLICATIONS

Office Action dated Nov. 3, 2022 in Chinese Patent Application No. 202080020096.1, 7 pages.

* cited by examiner

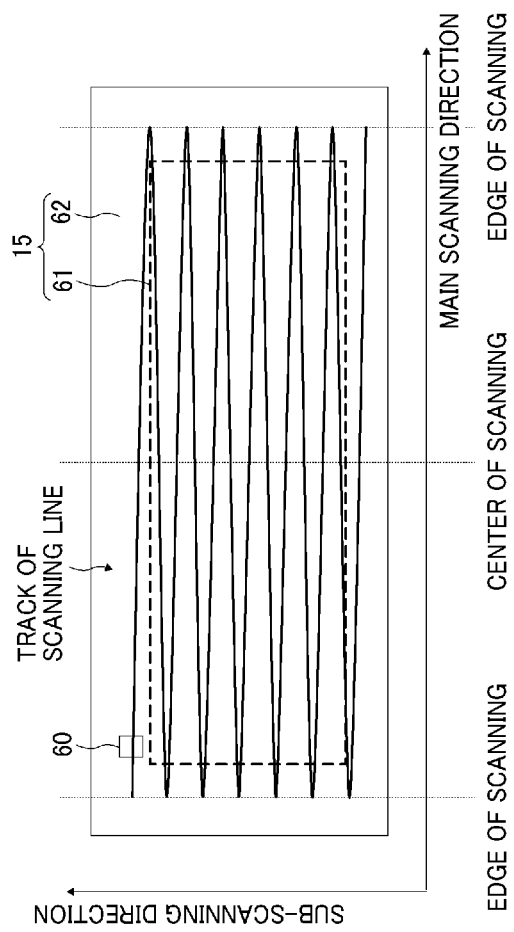

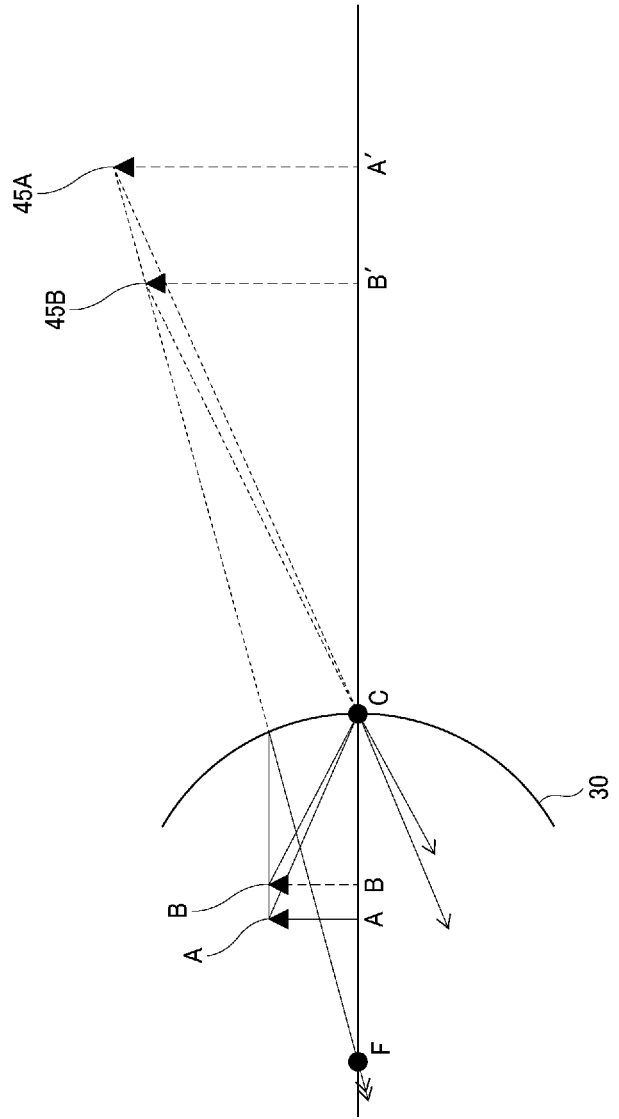

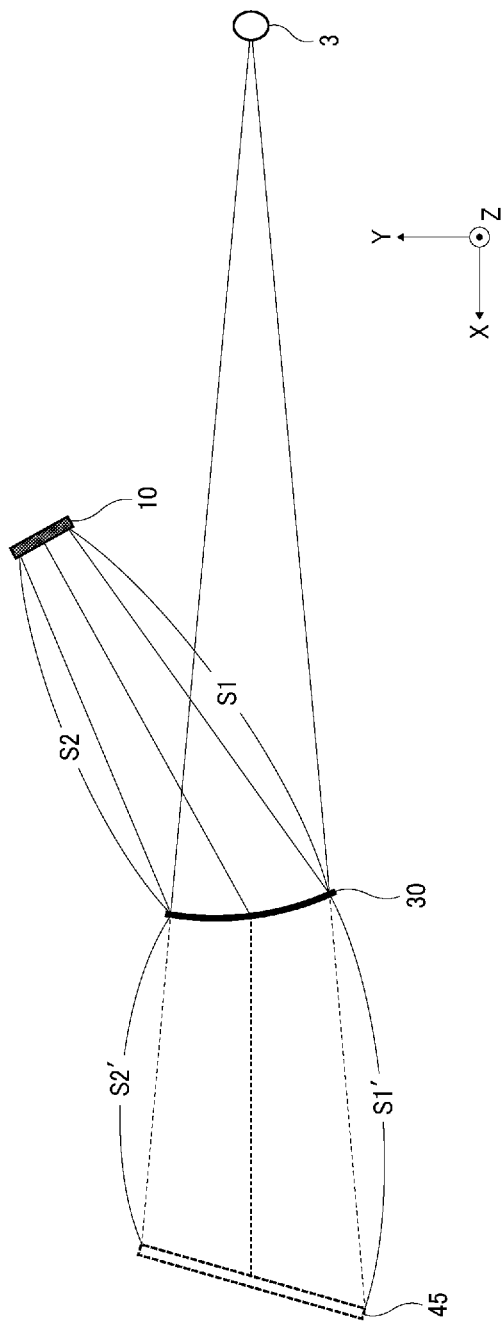

PROJECTOR, DISPLAY SYSTEM, AND MOBILE OBJECT

CROSS-REFERENCE TO RELATED APPLICATION

The present application is based on PCT filing PCT/JP2020/007508, filed Feb. 25, 2020, which claims priority to Japanese Patent Application 2019-050099, filed Mar. 18, 2019, the entire contents of which are incorporated herein by reference.

TECHNICAL FIELD

Embodiments of the present disclosure relate to a projector, a display system, and a mobile object.

BACKGROUND ART

An image display apparatus is known in the art where each of the directions of travel of the light flux that is incident on an intermediate screen is set to a direction departing from the center of the scanning and the directions of travel of the light flux at both edges of an intermediate screen in the main scanning direction are different from each other in the main scanning direction (see PTL 1).

CITATION LIST

Patent Literature

PTL 1: Japanese Patent Application Publication No. 2016-130759

SUMMARY OF INVENTION

Technical Problem

A projector, a display system, and a mobile object are to be provided in which reduction in image quality due to differences in the optical-path length between an image forming unit and an imaging optical system is prevented.

Solution to Problem

A projector includes an image forming unit configured to emit image light that forms an image and an imaging optical system configured to form an image by reflecting the image light. S magnification power at a point of the imaging optical system where the image light is incident and optical-path length between the image forming unit and the imaging optical system is short is made higher than a magnification power at a point of the imaging optical system where the image light is incident and the optical-path length between the image forming unit and the imaging optical system is long.

Advantageous Effects of Invention

According to one aspect of the present disclosure, a projector, display system, and a mobile object can be provided in which reduction in image quality due to differences in the optical-path length between an image forming unit and an imaging optical system is prevented.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 16 is a diagram illustrating the track of a scanning line when two-dimensional scanning is performed, according to embodiments of the present disclosure.

FIG. 17 is a schematic diagram illustrating the operating principles of an imaging optical system according to embodiments of the present disclosure.

FIG. 18A and FIG. 18B are diagrams each illustrating a mounted device according to a control sample of an embodiment of the present disclosure.

DESCRIPTION OF EMBODIMENTS

Embodiments of the present disclosure are described below with reference to the accompanying drawings. In the description of the drawings, like reference signs denote like elements, and overlapping descriptions are omitted.

Figure 1:
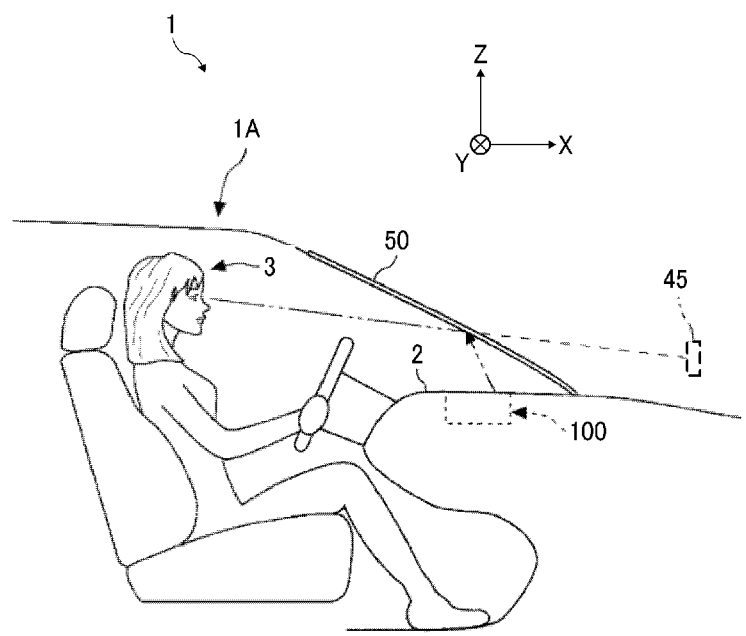
FIG. 1 is a diagram illustrating a system configuration of a display system according to embodiments of the present disclosure.

FIG. 1 is a diagram illustrating a system configuration of a display system according to embodiments of the present disclosure.

In the display system 1, the observer 3 can visually identify a display image as projection light is projected from a mounted device 100 onto a transmissive reflector. The mounted device 100 is an example of a projector, and the display image is an image superimposed on the viewing field of the observer 3 as a virtual image 45. For example, the display system 1 is provided for a mobile object such as a vehicle, an aircraft, and a ship, or an immobile object such as a maneuvering simulation system, and a home-theater system. In the present embodiment, cases are described in which the display system 1 is provided for a car that is an example of a mobile object 1A. However, no limitation is intended thereby, and the type of usage of the display system 1 is not limited to the present embodiment. The coordinate axes are defined as follows assuming that the directions of travel of the mobile object 1A is the X-axis direction, the right and left directions of the mobile object 1A is the Y-axis direction, and the up-and-down directions of the mobile object 1A is the Z-axis direction.

For example, the display system 1 is mounted in a vehicle, and makes navigation information visible to the observer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the observer 3 and the front windshield 50 is about several tens of centimeters (cm) to one meter (m). In some embodiments, a combiner that is made of a small transparent plastic disk or the like may be used as a transmissive reflector in place of the front windshield 50.

For example, the mounted device 100 is a heads-up display (HUD). The mounted device 100 may be disposed at any desired position in conformity with the interior design of the car. For example, the mounted device 100 may be disposed under a dashboard 2 of the car or may be embedded in the dashboard 2. In the present embodiment, cases in which the mounted device 100 is mounted in the dashboard 2 are described.

Figure 2:
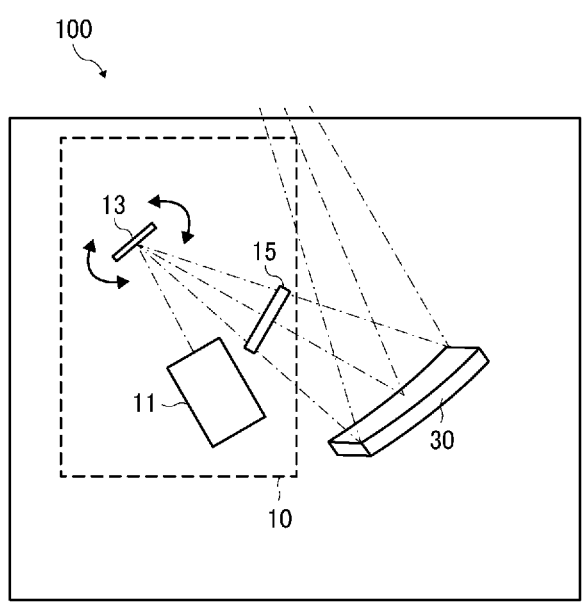
FIG. 2 is a diagram illustrating a configuration of a mounted device according to embodiments of the present disclosure.

FIG. 2 is a diagram illustrating a configuration of the mounted device 100 according to the present embodiment.

The mounted device 100 includes a display device 10 and a free-form surface mirror 30.

The display device 10 includes a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 is an example of an image forming unit that receives the irradiation light emitted from the light-source device 11 and emits image light for forming an image, and uses, for example, a micro-electromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams emitted from the light deflector 13 scans the screen 15. The light deflector 13 is not limited to a MEMS mirror, but may be configured by a polygon mirror or the like.

The screen 15 is an example of a screen on which the image light emitted from the light deflector 13 forms an image, and serves as a divergent part through which laser beams diverge at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the present embodiment adopts the laser scanning system. In particular, in the laser scanning system, since emitting/non-emitting can be assigned to each pixel, in general, a high-contrast image can be formed. In some alternative embodiments, the panel system may be adopted as the projection system in the display device 10.

The virtual image 45 as illustrated in FIG. 1 is projected onto the free-form surface mirror 30 and the front windshield 50 as the intermediate image 40 that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the observer 3 in the depth direction by, for example, at least 1 m and equal to or shorter than 30 m (preferably, equal to or shorter than 10 m). The free-form surface mirror 30 may be a concave mirror or an element with a light-gathering power. The free-form surface mirror 30 is an example of an image forming optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the observer 3 visually recognizes the virtual image 45 and the scenery ahead of the mobile object (vehicle). The virtual image 45 is an image that is visually recognized by the observer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected towards the free-form surface mirror 30, and are reflected by the front windshield 50. Accordingly, the observer 3 can visually recognize the virtual image 45, i.e., the magnified image of the intermediate image 40 formed on the screen 15, due to the light reflected by the front windshield 50.

Figure 3:
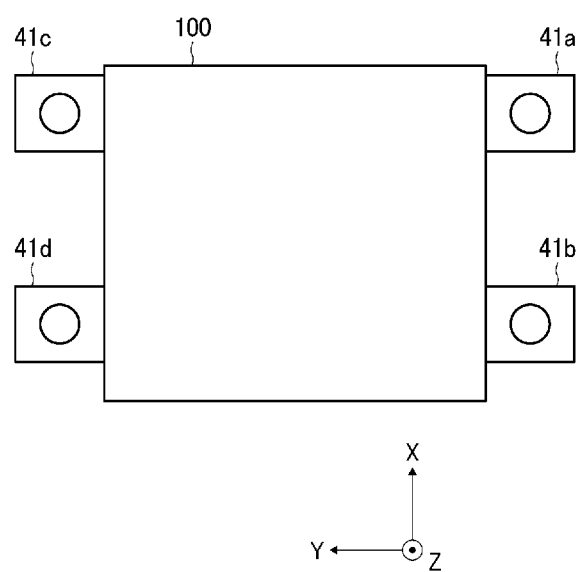
FIG. 3 is a top view of a mounted device according to embodiments of the present disclosure.

FIG. 3 is a diagram illustrating a top view of the mounted device 100 according to the present embodiment.

As illustrated in FIG. 3, the mounted device 100 includes two attaching parts 41a and 41b on the right side, and includes two attaching parts 41c and 41d on the left side. These attaching parts 41a, 41b, 41c, and 41d are attach the mounted device 100 to the mobile object 1A. Each of the attaching parts 41a to 41d has a screw hole, and the mounted device 100 is attached to the mobile object 1A through these screw holes.

Figure 4:
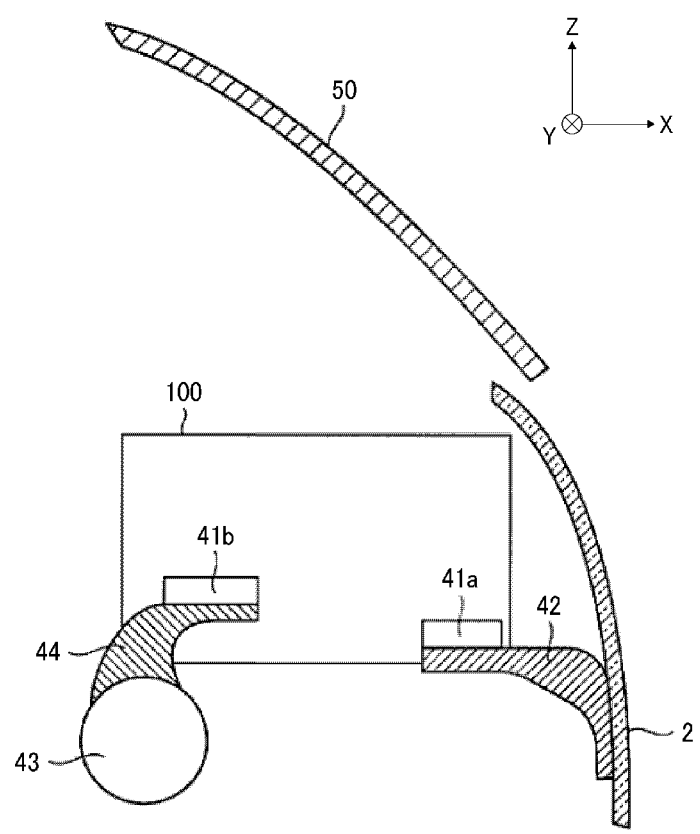
FIG. 4 is a side view of a mounted device according to embodiments of the present disclosure.

FIG. 4 is a right side view of the mounted device 100 attached to the mobile object 1A, according to the present embodiment.

The mobile object 1A includes an attaching bracket 42, which is welded or fastened to the instrument panel 2, and an attaching bracket 44, which is welded or fastened to a cross car beam 43. The attaching bracket 42 and the attaching bracket 44 are an example of an installation part. The mounted device 100 is attached to the mobile object 1A by fastening the attaching parts 41a and 41c to the attaching bracket 42 using screws or the like and by fastening the attaching parts 41b and 41d to the attaching bracket 44 using screws or the like.

Figure 5:
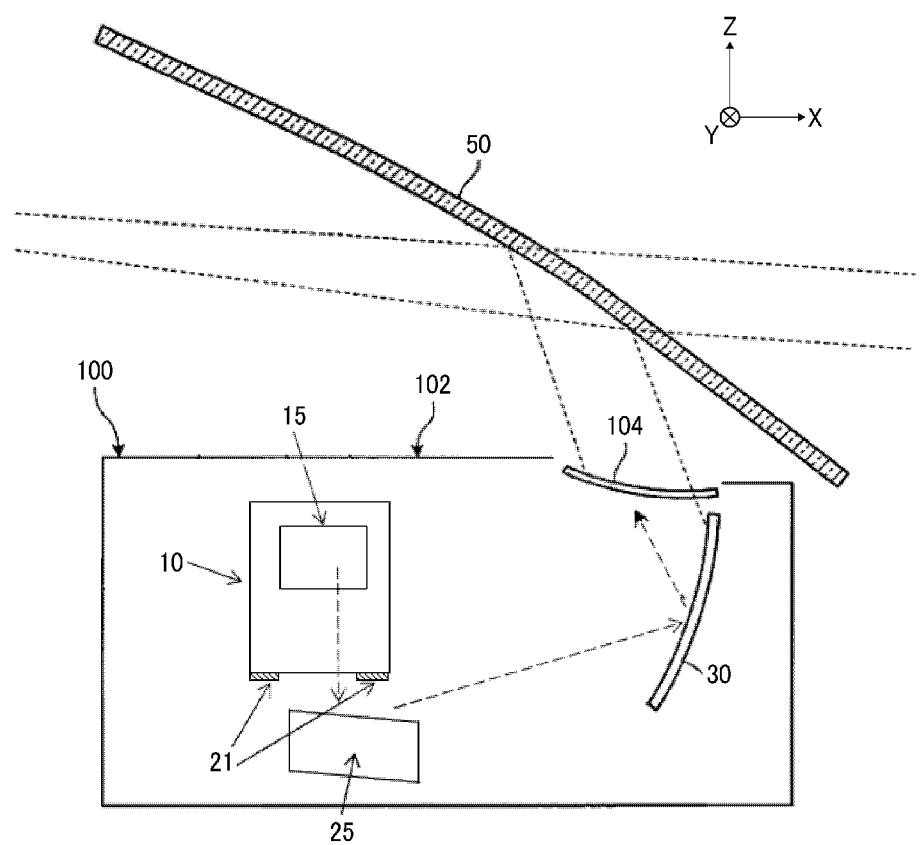
FIG. 5 is a cross-sectional side view of a mounted device according to embodiments of the present disclosure.

FIG. 5 is a cross-sectional side view of the mounted device 100 as viewed from the right direction (the right side in the Y-direction), according to the present embodiment.

Figure 6:
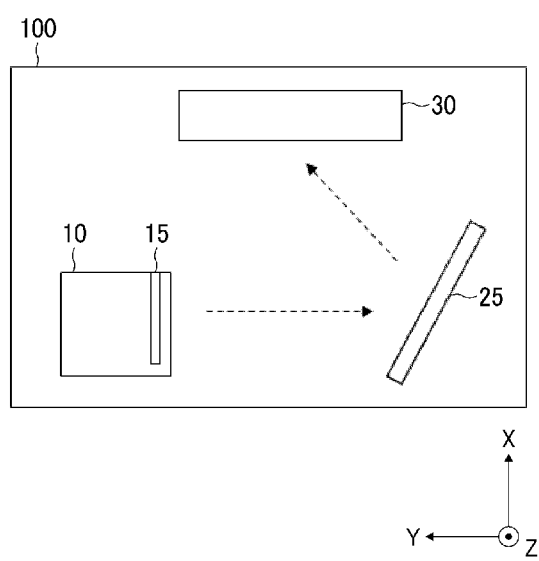
FIG. 6 is a cross-sectional top view of a mounted device according to embodiments of the present disclosure.

FIG. 6 is a cross-sectional top view of the mounted device 100 as viewed from the upward direction (the Z-direction), according to the present embodiment.

FIG. 5 and FIG. 6 illustrate a concrete arrangement inside the mounted device 100 according to the present embodiment.

In addition to the display device 10 and the free-form surface mirror 30 as described above with reference to FIG. 2, the mounted device 100 includes a mirror 25 that is arranged inside a housing 102 to reflect the laser beams projected from the display device 10 towards the free-form surface mirror 30. The housing 102 has an exit window 104 that transmits the light reflected by the free-form surface mirror 30 and projects the reflected light onto the front windshield 50. The exit window is an example of a light transmission member. The display device 10 and the screen 15 are arranged so that the laser beams are projected in the right direction (the right side in the Y-direction).

Figure 7:
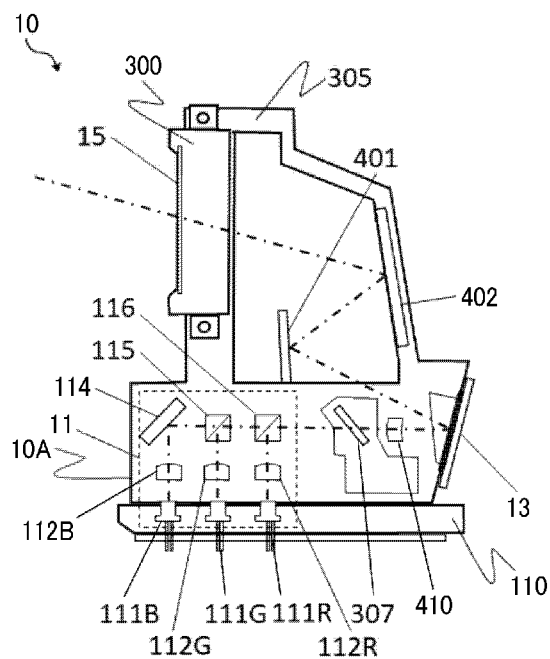
FIG. 7 is a diagram illustrating a configuration of a display device according to embodiments of the present disclosure.

FIG. 7 is a diagram illustrating a configuration of the display device 10 according to the present embodiment.

In addition to the light-source device 11, the light deflector 13, and the screen 15 as described above with reference to FIG. 2, the display device 10 further includes a filter 307 that modulates the laser beams emitted from the light-source device 11, a condenser lens 410 that condenses the laser beams modulated by the filter 307 towards the light deflector 13, a first mirror 401 that reflects the laser beams deflected by the light deflector 13, and a second mirror 402 that reflects the laser beams reflected by the first mirror 401 towards the screen 15.

The light-source device 11 includes light-source elements 111R, 111G, and 111B (these light-source elements may be referred to simply as a light-source element 111 in the following description when it is not necessary to distinguish each of the light-source elements), coupling lenses (collimator lenses) 112R, 112G, and 112B, apertures 113R, 113G, and 113B, combiners 114, 115, and 116, and a lens 117.

For example, each of the light-source elements 111R, 111G, and 111B of three colors (red, green, and blue (RGB)) is a laser diode (LD) having a single or a plurality of light-emitting points. The light-source elements 111R, 111G, and 111B emit laser beams (light flux) having different wavelengths $\lambda R$, $\lambda G$, and $\lambda B$, respectively. For example, $\lambda R=640$ nanometers (nm), $\lambda G=530$ nm, and $\lambda B=445$ nm.

The emitted laser beams (light flux) are coupled by the coupling lenses 112R, 112G, and 112B, respectively, and become approximately collimated light flux. The coupled laser beams (light flux) are combined by the three combiners 114, 115, and 116. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined laser beams (light flux) pass through the filter 307 and the condenser lens 410 and are guided to the light deflector 13.

The display device 10 is formed by assembling a housing 10A, a mirror unit (mirror holding member) 305, and a screen unit 300. The housing 10A holds and stores the light-source elements 111R, 111G, and 111B, the coupling lenses 112R, 112G, and 112B, the combiners 114, 115, and 116, the filter 307, the condenser lens 410, and the light deflector 13. The mirror unit 305 holds the first mirror 401 and the second mirror 402. The screen unit 300 is an example of a holding member that holds the screen 15.

A light source unit 110 is removable from the housing 10A and holds the light-source elements 111R, 111G, and 111B.

Figure 8:
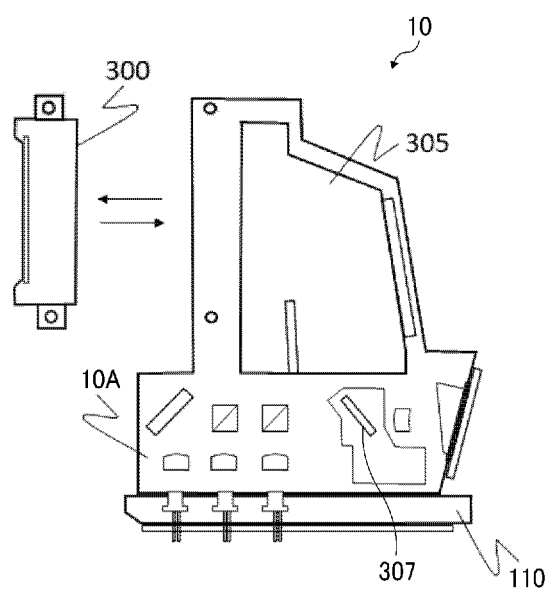
FIG. 8 is a diagram illustrating how a screen unit is attached to and removed from a display device, according to embodiments of the present disclosure.

FIG. 8 illustrates how the screen unit 300 is attached to and removed from the display device 10, according to the present embodiment.

The screen unit 300 is attachable to and removable from the housing 10A without removing the light source unit 110 and the mirror unit 305 from the housing 10A. Moreover, the screen unit 300 is attachable to and removable from the housing 10A without removing the light-source device 11, the filter 307, the condenser lens 410, and the light deflector 13

The housing 10A is made of die-casting aluminum, and the mirror unit 305 is made of resin. The housing 10A has a higher thermal conductivity than the mirror unit 305.

The image light that diverges through the screen 15 reaches the front windshield 50 along the optical path as illustrated in FIG. 1 and FIG. 2. However, in actual use, the sunlight that irradiates the front windshield 50 may travel reversely along the light path and may reach the screen 15 or the screen unit 300. In such cases, the shape or color of the screen 15 may change due to the heat of the sunlight, and the image quality may deteriorate.

In order to handle such a situation, in the present embodiment, the screen unit 300 is attached to the housing 10A. By so doing, compared with a case in which the screen unit 300 is attached to the mirror unit 305 that is positioned on the upstream side on the optical path, the heat of the screen 15 and the screen unit 300 can be easily dissipated, and the reduction in image quality can be prevented.

Moreover, the screen unit 300 is attachable to and removable from the housing 10A without removing, for example, the first mirror 401 and the second mirror 402 held by the mirror unit 305, the light deflector 13 from the housing 10A. Due to this configuration, the replacement or maintenance of the screen unit 300 can easily be performed in an independent manner. Accordingly, even when the shape or color of the screen 15 changes, the reduction in image quality can be prevented by performing replacement or maintenance of the screen 15.

As the curvature of the front windshield 50 differs depending on its type (vehicle type) of the mobile object 1A, the size, the position, and the angle of the screen 15 need to be adjusted in a delicate manner in accordance with the imaging optical system (i.e., the free-form surface mirror 30). However, by making the screen unit 300 detachable from the housing 10A or the like, the housing 10A or the like can be shared, and the productivity can be improved.

Figure 9:
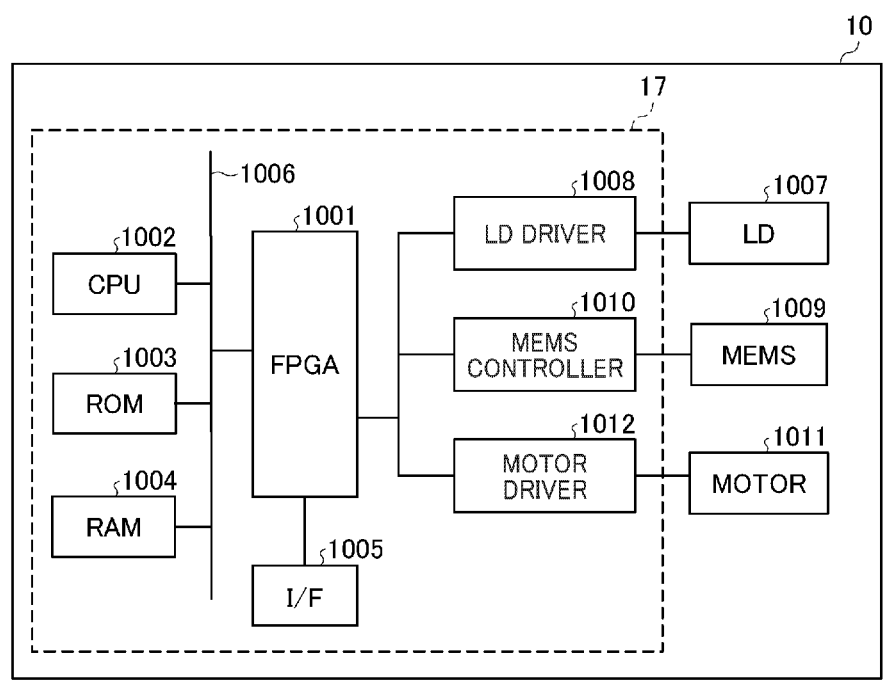
FIG. 9 is a diagram illustrating a hardware configuration of a display device according to embodiments of the present disclosure.

FIG. 9 is a diagram illustrating a hardware configuration of the display device 10 according to the present embodiment.

When necessary, some components or elements may be added to or deleted from the hardware configuration illustrated in FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis of the free-form surface mirror 30. The motor driver 1012 is a circuit that generates a driving signal for driving the motor 1011.

Figure 10:
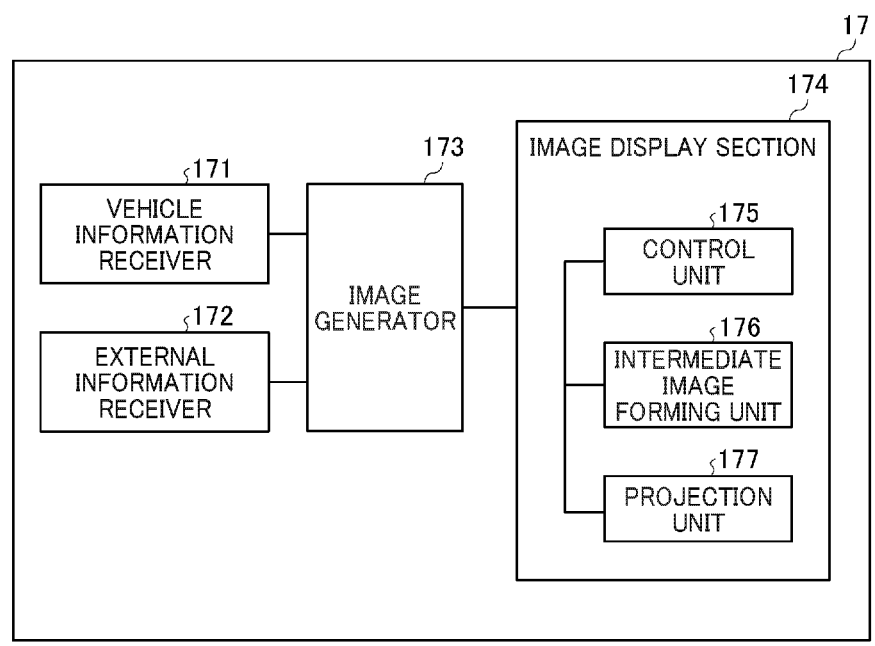
FIG. 10 is a diagram illustrating a functional configuration of a display device according to embodiments of the present disclosure.

FIG. 10 is a diagram illustrating a functional configuration of a display device according to embodiments of the present disclosure.

The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image 40 and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms an intermediate image 40 on the screen 15 based on the control signal generated by the control unit 175. The projection unit 177 projects the laser beams that form the intermediate image 40 towards the transmissive reflector (e.g., the front windshield 50) in order to form the virtual image 45 to be visually recognized by the observer 3.

Figure 11:
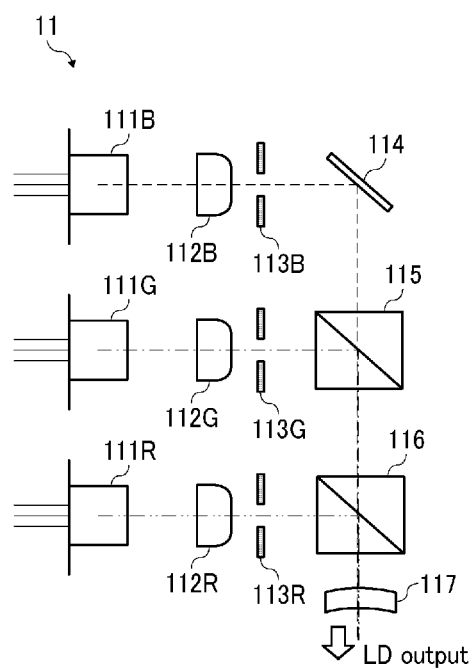
FIG. 11 is a diagram illustrating a specific configuration of a light-source device according to embodiments of the present disclosure.

FIG. 11 is a diagram illustrating a specific configuration of the light-source device 11 according to the present embodiment.

In addition to the elements as described above with reference to FIG. 7, the light-source device 11 is provided with apertures 113R, 113G, and 113B that shape the laser beams (light flux) that are coupled by the coupling lenses 112R, 112G, and 112B, respectively. The apertures 113R, 113G, and 113B are placed between the coupling lenses 112R, 112G, and 112B and the combiners 114, 115, and 116

The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

Figure 12:
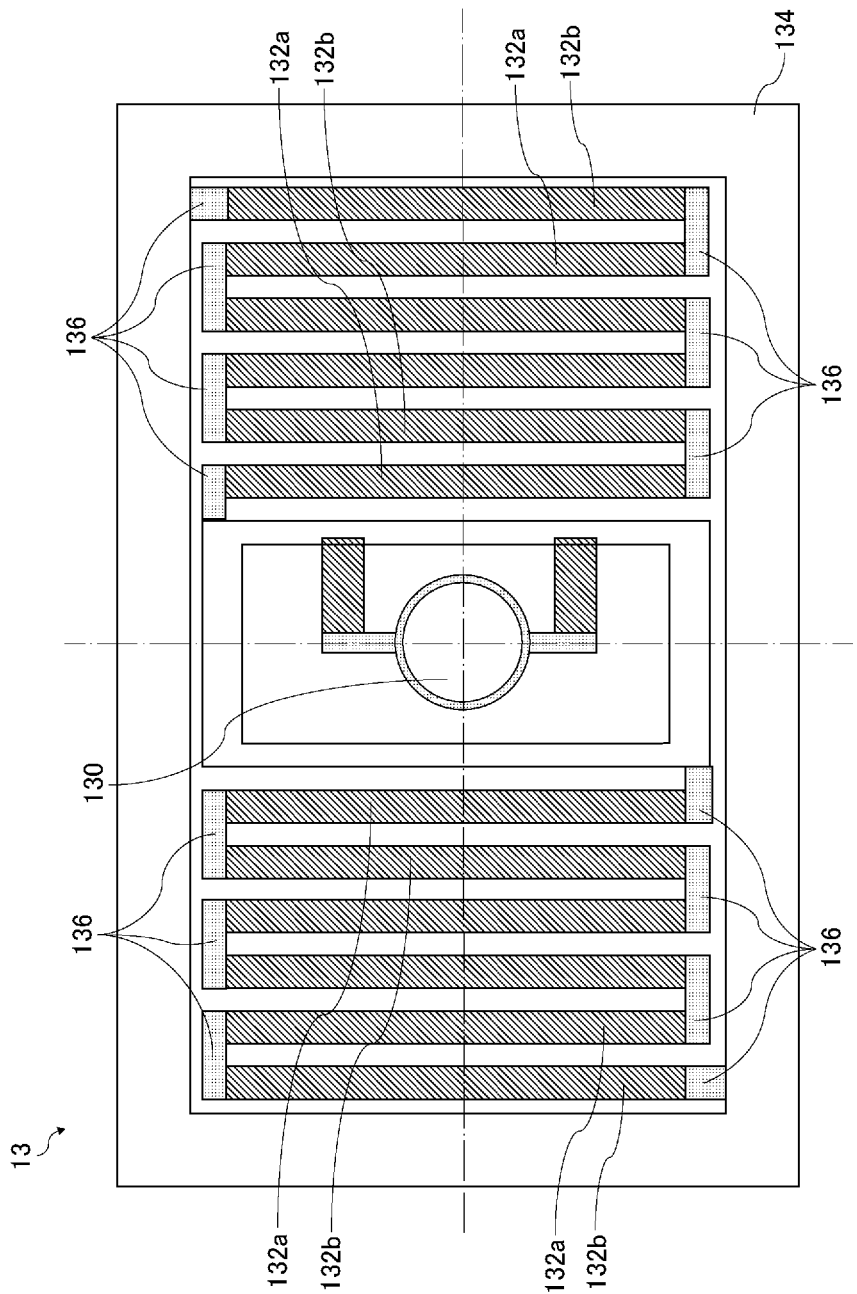
FIG. 12 is a diagram illustrating a specific configuration of a light deflector according to embodiments of the present disclosure.

FIG. 12 is a diagram illustrating a specific configuration of the light deflector 13 according to the present embodiment.

The light deflector 13 is a MEMS mirror produced by semiconductor processing, and includes a mirror 130, a serpentine beam 132, a frame 134, and a piezoelectric member 136. The light deflector 13 is an example of a scanner.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132*a* and a second beam 132*b* that are arranged alternately. Each of the pair of serpentine beams 132 is supported by the frame 134. The piezoelectric member 136 is disposed such that the first beam 132*a* and the second beam 132*b*, which are adjacent to each other, are coupled to each other. The piezoelectric member 136 applies different levels of voltage to the first beam 132*a* and the second beam 132*b* to bend each of the first beam 132*a* and the second beam 132*b* differently.

As a result, the first beam 132*a* and the second beam 132*b*, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Figure 13:
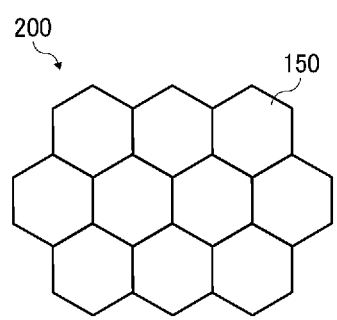
FIG. 13 is a diagram illustrating a specific configuration of a screen according to embodiments of the present disclosure.

FIG. 13 is a diagram illustrating a specific configuration of the screen 15 according to the present embodiment.

The laser beams emitted from the LD 1007 that configures a part of the light-source device 11 on the screen 15. The screen 15 serves as a divergent part that diverges the laser beams at a predetermined divergence angle. As an example configuration in which a plurality of curved portions through which the light diverges are provided, the screen 15 as illustrated in FIG. 13 has a microlens-array structure in which a plurality of hexagonal-shaped microlenses 150 are arranged with no gap therebetween. The microlenses 150 are convex portions that are an example of the curved portions. The lens diameter of each one of the microlenses 150 (the distance between two sides that are opposed to each other) is about 200 micrometers (μm). As the microlenses 150 of the screen 15 have a hexagonal shape, the multiple microlenses 150 can be arrayed with high density. The microlens array 200 and the microlenses 150 according to the present embodiment will be described later in detail.

Figure 14A:
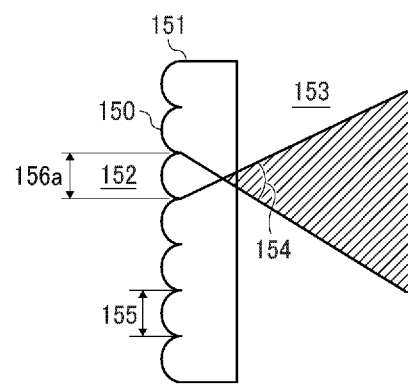
FIG. 14A and FIG. 14B are diagrams illustrating a difference in operation due to the differences in sizes of the diameter of incident light flux and the lens diameter in a microlens array, according to embodiments of the present disclosure.
Figure 14B:
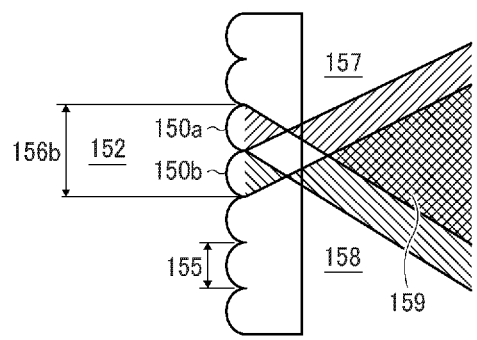

FIG. 14A and FIG. 14B are diagrams illustrating a difference in operation due to differences in sizes of the diameter of incident light flux and the lens diameter in the microlens array, according to the present embodiment.

In FIG. 14A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the incident light 152 can diverge through the screen 15 at a desired divergence angle 154. The Lens diameter 155 at which the microlenses 150 are arranged is designed to be wider than the diameter 156*a* of the incident light 152. Accordingly, the screen 15 does not cause interference among the lenses, and interfering noise can be prevented from occurring.

FIG. 14B is a diagram illustrating the optical paths of diverging lights when the diameter 156*b* of the incident light 152 is twice wider than the lens diameter 155 at which the microlenses 150 are arranged. The incident light 152 is incident on two microlenses 150*a* and 150*b*, and these two microlenses 150*a* and 150*b* produce two diverging lights 157 and 158, respectively. In such cases, lights may interfere with each other as two diverging lights exist in an area 159. Such an interference between two diverging lights (coherent light) is visually recognized as an interfering noise by an observer.

In view of the above circumstances, the lens diameter 155 at which the microlenses 150 are arranged is designed to be wider than the diameter 156*b* of the incident light 152 in order to reduce the interfering noise. A configuration with convex lenses is described as above with reference to FIG. 14A and FIG. 14B. However, no limitation is indicated thereby, and advantageous effects can be expected in a similar manner in a configuration with concave lenses.

Figure 15:
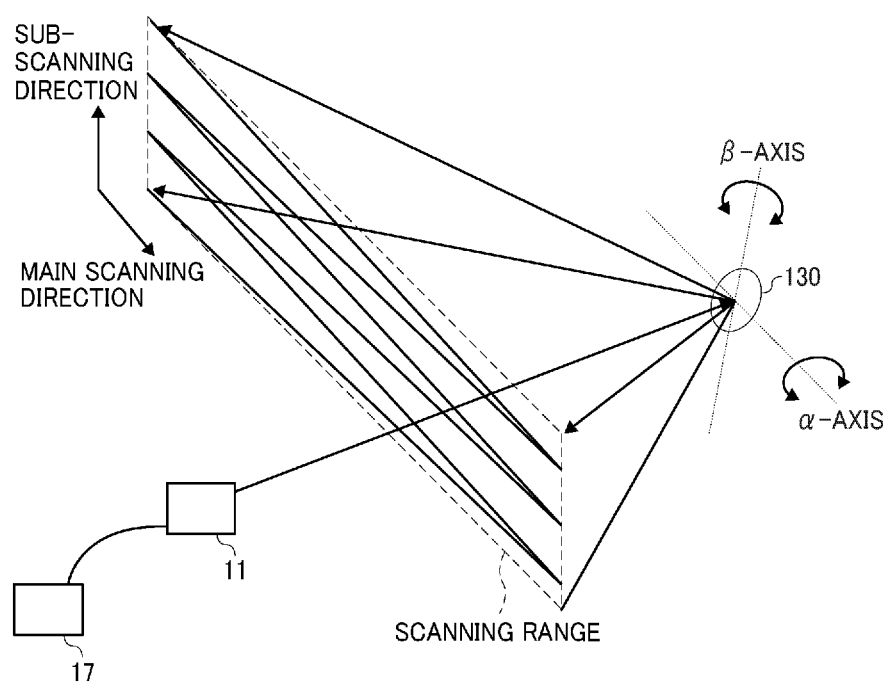
FIG. 15 is a diagram illustrating the relation between a mirror of a light deflector and the scanning range, according to embodiments of the present disclosure.

FIG. 15 is a diagram illustrating the relation between the mirror 130 of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 15, the laser beams that are emitted from the multiple light-source elements and whose optical paths are combined are two-dimensionally deflected about the a axis and the p axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beam scans (two-way scans) the scanning range of the screen 15 in an oscillating manner in the main scanning direction at a high frequency of about 20,000 to 40,000 hertz (Hz), and scans (one-way scans) the scanning range of the screen 15 in the sub-scanning direction at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

FIG. 16 is a diagram illustrating the track of a scanning line when two-dimensional scanning is performed, according to the present embodiment.

As illustrated in FIG. 16, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 16, the track of the scanning line in the scanning range is indicated by a zigzag line. For the sake of explanatory convenience, the number of scanning lines in FIG. 16 is less than the actual number of scanning lines.

As described above, the screen 15 is configured by a transmissive optical element such as the microlens array 200 that diffuses light. In the present embodiment, the shape of the image area 61 is rectangular or planar. However, no limitation is intended thereby, and the shape of the image area 61 may be polygonal or curved. Further, in some embodiments, the screen 15 may be a reflective optical element such as a micromirror array that diffuses light, depending on the design or layout of the display device 10. In the following description of the present embodiment, it is assumed that the screen 15 is configured by the microlens array 200.

The screen 15 is provided with a synchronous detection system 60 that includes a light receiver disposed at the edges of the image area 61 (a part of the frame area 62) in the scanning range. In FIG. 16, the synchronous detection system 60 is disposed on the −X and +Y side of the image area 61 (the main scanning direction and the sub-scanning direction correspond to the X-direction and Y-direction, respectively). More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

FIG. 17 is a schematic diagram illustrating the operating principles of an imaging optical system according to the present embodiment. More specifically, FIG. 17 is a schematic diagram illustrating the relation between the size of a virtual image and the optical-path length in a general-purpose extended projection optical system (imaging optical system), according to the present embodiment.

When an object A is disposed on a side closer to the free-form surface mirror 30 than a focal point F of the free-form surface mirror 30 that is an example of an extended projection optical system (imaging optical system), a virtual image 45A of the object A is formed on the other side of the free-form surface mirror 30. The position of the virtual image 45A in this case is referred to as A'. When an object B is disposed on a side even closer to the free-form surface mirror 30 than the object A, a virtual image 45B of the object B is formed on the other side of the free-form surface mirror 30. The position of the virtual image 45B in this case is referred to as B'. According to the known formula for the image formation by lenses, the magnifying power β of the free-form surface mirror 30 can be expressed as follows.

$$\beta = CA'/AC = CB'/BC$$

Accordingly, the following equation can be obtained.

$$CA'/CB' = AC/BC$$

As AC>BC, AC/BC>1. Accordingly, CA'/CB'>1, and CA'>CB'.

As described above, assuming that the magnifying power β of the free-form surface mirror 30 remains the same, the distance from the free-form surface mirror 30 to the virtual image 45 gets shorter as the distance from the object to the free-form surface mirror 30 is shorter.

Figure 18A:
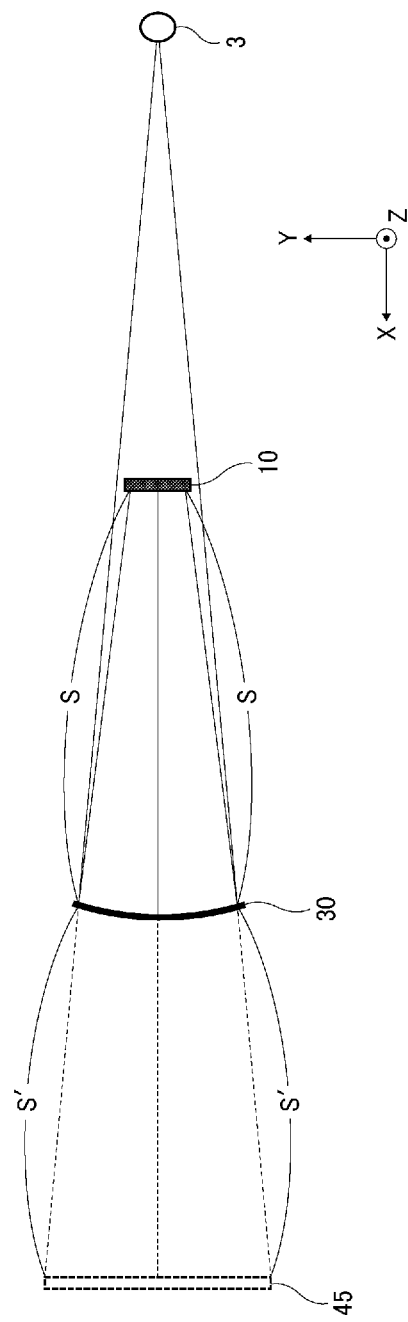

FIG. 18A and FIG. 18B are diagrams each illustrating the mounted device 100 according to a control sample of the above embodiment of the present disclosure.

In FIG. 18A and FIG. 18B, the operating principles as described above with reference to FIG. 17 are applied to the virtual image 45 that is formed by the mounted device 100. In other words, FIG. 18A and FIG. 18B are plan views of the display device 10 when the mounted device 100 is viewed from the +Z-direction (i.e., the height direction), an imaging optical system including the free-form surface mirror 30 and the front windshield 50, the virtual image 45, and the observer 3 (the location of the eyepoint). In the description given below, it is assumed that the magnifying power is the same between both edges of the free-form surface mirror 30 (imaging optical system) in the Y-direction.

FIG. 18A is a plan view when a decentering optical system is not used, and FIG. 18B is a plan view when a decentering optical system is used. In FIG. 18B, the display device 10 is decentered in the Y-direction (i.e., the width direction of the vehicle) with respect to the optical path from the observer 3 to the free-form surface mirror 30 and the virtual image 45, and the incident angle that the optical axis in the direction of the normal to the screen of the display device 10 forms with the center of the free-form surface mirror 30 is inclined with reference to the direction of the normal to the center of the free-form surface mirror 30.

When a decentering optical system is not used as illustrated in FIG. 18A, the optical-path length S from the display device 10 to the free-form surface mirror 30 is the same between both edges in the Y-direction, and the optical-path length S' from the free-form surface mirror 30 to the virtual image 45 is also the same between both edges in the Y-direction.

When the mounted device 100 is provided for the vehicle, there are some cases in which a decentering optical system as illustrated in FIG. 18B is advantageous in layout as such a decentering optical system can be disposed so as not to interfere with the other parts of the vehicle arranged inside the instrument panel (dashboard) 2. The direction in which the display device 10 is decentered is not limited to the Y-direction (i.e., the width direction of the vehicle), and a similar effect can also be achieved, for example, by decentering the display device 10 in the Z-direction (i.e., the height direction of the vehicle). As a matter of course, the decentering in the Y-direction and the decentering in the Z-direction may be combined in an effective manner.

However, when a decentering optical system is used as illustrated in FIG. 18B, optical-path length S1 and optical-path length S2 at both edges of the image light in the Y-direction differ from each other on the optical path from the display device 10 to the free-form surface mirror 30 (S1>S>S2). In such a case, based on the operating principles as described above with reference to FIG. 17, optical-path length S1' and optical-path length S2' of the optical path from the free-form surface mirror 30 to the virtual image 45 are different from each other (S1'>S'>S2'), proportionate to the difference between the optical-path length S1 and optical-path length S2 of the optical path from the display device 10 to the free-form surface mirror 30 at both edges of the free-form surface mirror 30 in the Y-direction. Due to this configuration, when the observer 3 views the virtual image 45, the virtual image 45 appears as if it is inclined in the X-direction (i.e., the depth direction of the mobile object 1A).

Figure 19A:
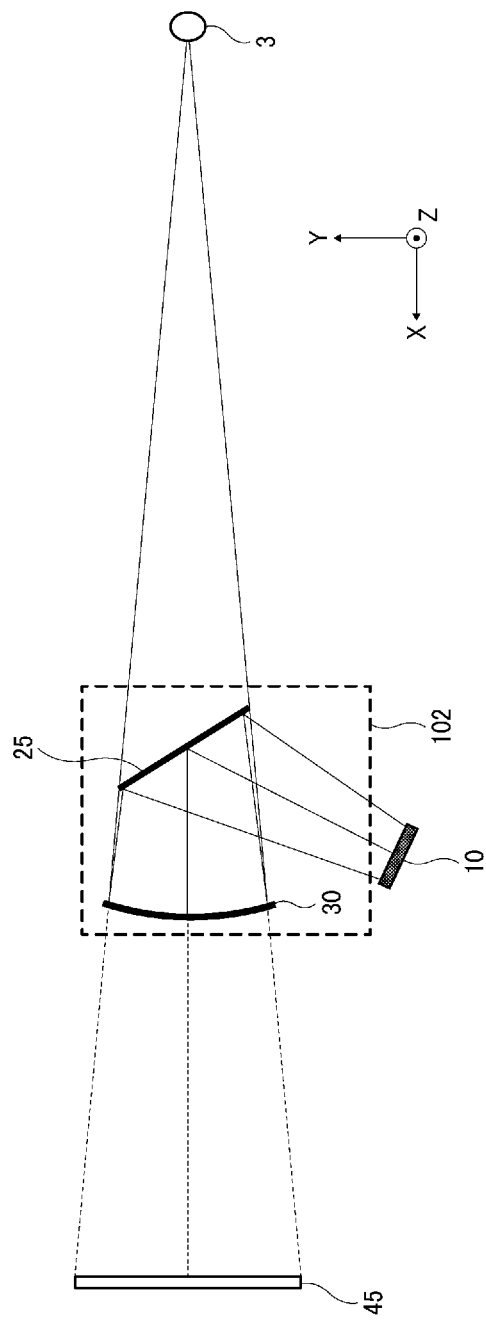
FIG. 19A and FIG. 19B are diagrams each illustrating a mounted device according to a control sample of an embodiment of the present disclosure.
Figure 19B:
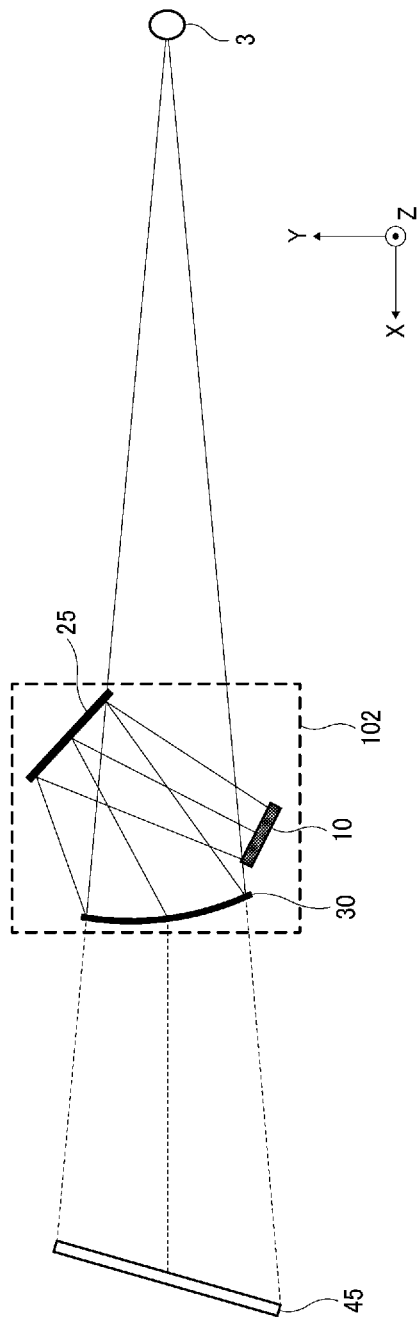

FIG. 19A and FIG. 19B are diagrams each illustrating the mounted device 100 according to a control sample of the above embodiment of the present disclosure.

FIG. 19A is a plan view when a decentering optical system is not used, which corresponds to FIG. 18A. FIG. 19B is a plan view when a decentering optical system is used, which corresponds to FIG. 18B. In a similar manner to FIG. 18A and FIG. 18B, the imaging optical system includes the free-form surface mirror 30 and the front windshield 50, and it is assumed that the magnifying power is the same between both edges of the free-form surface mirror 30 (imaging optical system) in the Y-direction.

In addition to the display device 10 and the free-form surface mirror 30 as described above with reference to FIG. 5, the mounted device 100 as illustrated in FIG. 19A and FIG. 19B includes a mirror 25 that is arranged to reflect the laser beams projected from the display device 10 towards the free-form surface mirror 30, in order to achieve a reduction in size.

When a decentering optical system is not used as illustrated in FIG. 19A, the virtual image 45 is not inclined in the X-direction (i.e., the depth direction of the mobile object 1A). However, it becomes difficult to accommodate the display device 10 in the housing 102.

On the other hand, when a decentering optical system is used as illustrated in FIG. 19B, the display device 10 can be accommodated in the housing 102 by decentering the display device 10 in the Y-direction (i.e., the width direction of the vehicle). However, the virtual image 45 appears as if it is inclined in the X-direction (i.e., the depth direction of the mobile object 1A), which is undesirable.

In the present embodiment, the technical problems in the above control sample as described above with reference to FIG. 18A, FIG. 18B, FIG. 19A, and FIG. 19B are to be handled and solved. More specifically, in the present embodiment, the display device 10 is accommodated in the housing 102, and the virtual image 45 is not inclined in the X-direction (i.e., the depth direction of the mobile object 1A).

Figure 20:
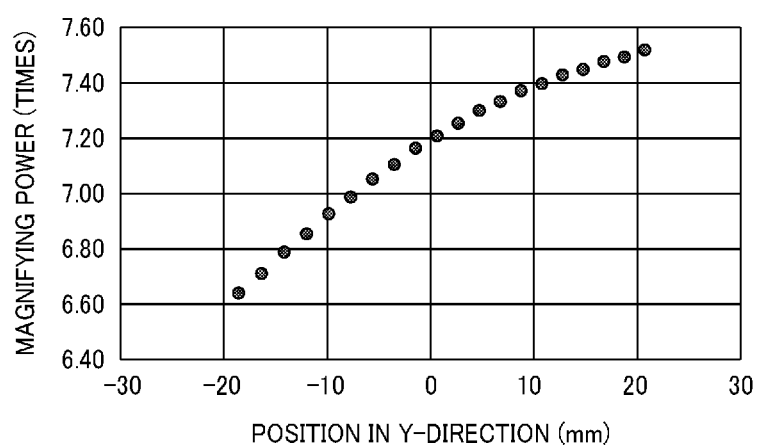
FIG. 20 is a schematic diagram illustrating an imaging optical system including a free-form surface mirror and a front windshield, according to embodiments of the present disclosure.

FIG. 20 is a schematic diagram illustrating an imaging optical system including the free-form surface mirror 30 and the front windshield 50, according to the present embodiment.

FIG. 20 is a graph where the horizontal axis indicates varying positions of the display device 10 in the Y-direction and the vertical axis indicates the magnifying power of the free-form surface mirror 30, in a decentering optical system as illustrated in FIG. 18B and FIG. 19B where the display device 10 is decentered in the Y-direction (i.e., the width direction of the vehicle) with respect to the optical path from the observer 3 to the free-form surface mirror 30 and the virtual image 45.

As illustrated in FIG. 20, the magnifying power is low on a −Y side of the free-form surface mirror 30 where the optical-path length is longer, and the magnifying power is high on a +Y side of the free-form surface mirror 30 where the optical-path length is shorter.

In the case of the decentering optical system as illustrated in FIG. 18B, the magnifying power α1 of the free-form surface mirror 30 at an edge of the image in the −Y-direction and the magnifying power α2 of the free-form surface mirror 30 at an edge of the image in the +Y-direction are set as follows.

$$\alpha 1 = (S'/S1)^2$$

$$\alpha 2 = (S'/S2)^2$$

In other words, the free-form surface mirror 30 is configured such that the magnifying power α2 at a point of the free-form surface mirror 30 where image light is incident and the optical-path length S2 from the display device 10 to the free-form surface mirror 30 is short becomes higher than the magnifying power α1 at a point of the free-form surface mirror 30 where image light is incident and the optical-path length S1 from the display device 10 to the free-form surface mirror 30 is long.

Due to such a configuration, deterioration of image quality due to differences in the optical-path length from the display device 10 to the free-form surface mirror 30 can be reduced. More specifically, a phenomenon can be prevented in which the virtual image 45 appears as if it is inclined in the X-direction (i.e., the depth direction of the mobile object 1A) when the observer 3 views the virtual image 45.

As illustrated in FIG. 2 and FIG. 7, the display device 10 is provided with the screen 15 on the most downstream side of the optical path. For this reason, the optical-path length from the display device 10 to the free-form surface mirror 30 is equivalent to the optical-path length from the screen 15 to the free-form surface mirror 30.

As illustrated in FIG. 2 and FIG. 7, the display device 10 is provided with the light deflector 13 on the upstream side of the screen 15 on the optical path, and thus the difference in optical-path length due to the optical-path length from the light deflector 13 to the screen 15 is ignorably small in the Y-direction. Accordingly, the optical-path length from the display device 10 to the free-form surface mirror 30 may be replaced with the optical-path length from the light deflector 13 to the free-form surface mirror 30.

Figure 21:
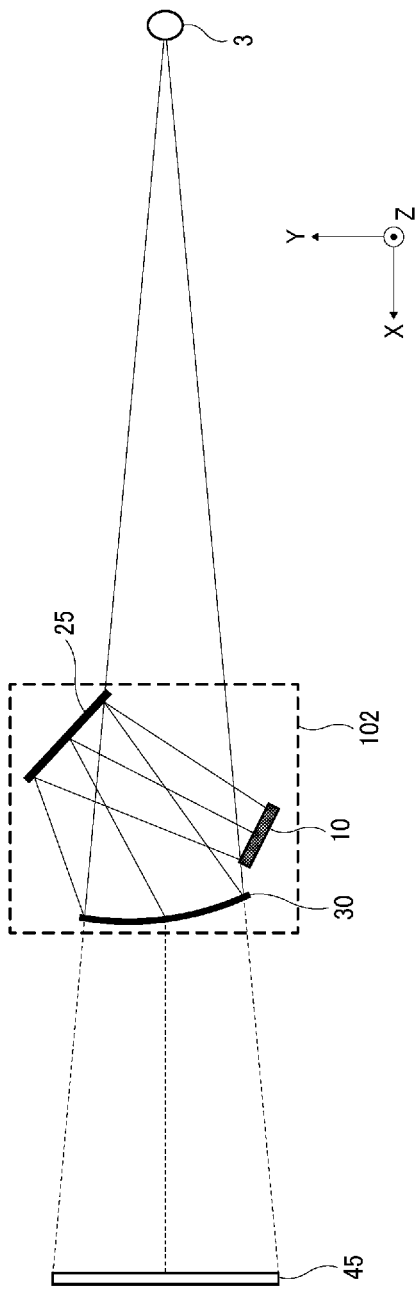
FIG. 21 is a schematic diagram illustrating a mounted device according to embodiments of the present disclosure.

FIG. 21 is a diagram illustrating a configuration of the mounted device 100 according to the present embodiment.

As illustrated in FIG. 20, the free-form surface mirror 30 as illustrated in FIG. 21 is configured such that the magnifying power at a point of the free-form surface mirror 30 where image light is incident and the optical-path length from the display device 10 to the free-form surface mirror 30 is short becomes higher than the magnifying power at a point of the free-form surface mirror 30 where image light is incident and the optical-path length from the display device 10 to the free-form surface mirror 30 is long.

In the mounted device as illustrated in FIG. 21, the display device 10 is decentered in the Y-direction (i.e., the width direction of the vehicle). Due to such a configuration, the display device 10 can be accommodated in the housing 102. Moreover, due to the above configuration of the free-form surface mirror 30, the virtual image 45 is prevented from being inclined in the X-direction (i.e., the depth direction of the mobile object 1A).

Figure 22:
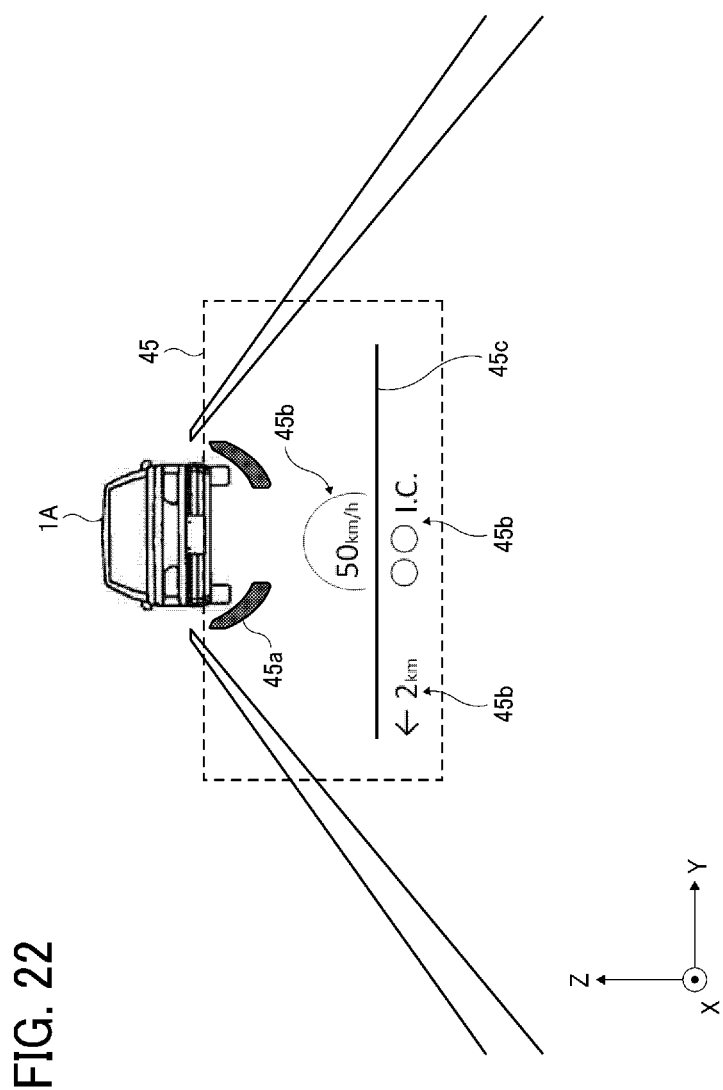
FIG. 22 is a diagram illustrating a virtual image according to embodiments of the present disclosure.

FIG. 22 is a diagram illustrating the virtual image 45 according to the present embodiment.

The virtual image 45 includes superimposition data 45*a* to be superimposed on a preceding vehicle (mobile object 1A), text data 45*b*, and ornamental data 45*c* that is, for example, a line that extends in the lateral directions (i.e., the X-direction).

In the present embodiment, as described above with reference to FIG. 20 and FIG. 21, the virtual image 45 is prevented from being inclined in the X-direction (i.e., the depth direction of the mobile object 1A). Accordingly, the superimposition of the superimposition data 45*a* on the preceding vehicle (mobile object 1A) can be prevented from being unnatural, and the ornamental data 45*c* (i.e., the horizontally oriented line) can be prevented from being displaced in the X-direction (i.e., the depth direction of the mobile object 1A) and visually recognized. As a result, there are few chances to give unnatural impression to the observer or driver.

The display device according to embodiments of the present disclosure is applicable not only to a heads-up display (HUD) but also to, for example, a head-mounted display, a prompter, and a projector. For example, when a display device according to embodiments of the present disclosure is applied to a projection device, such a projection device can be configured in a similar manner to the display device 10. In other words, the display device 10 may project the image light onto, for example, a projection screen or a wall through the free-form surface mirror 30.

This patent application is based on and claims priority pursuant to 35 U.S.C. § 119(a) to Japanese Patent Application No. 2019-050099, filed on Mar. 18, 2019, in the Japan Patent Office, the entire disclosures of which is hereby incorporated by reference herein.

REFERENCE SINGS LIST

1 Display system
10 Display device
10A Housing
11 Light-source device (an example of a light source)
13 Light deflector (an example of a scanner or image forming unit)
15 Screen (an example of an optical element)
30 Free-form surface mirror (an example of an imaging optical system)
45 Virtual image
50 Front windshield (an example of a reflector)
100 Projector
102 Housing

The invention claimed is:

1. A projector comprising:
an image forming system to emit image light that forms an image on a screen; and
an imaging optical system to reflect the image light to form a virtual image,
wherein an optical axis in a direction normal to the screen of the image forming system is decentered with respect to a direction normal to a center of the imaging optical system so that an optical-path length between the image forming system and an edge of the imaging optical system is shorter than another optical-path length between the image forming system and another edge of the imaging optical system,
wherein a magnification power at the edge of the imaging optical system is higher than a magnification power at the another edge of the imaging optical system.

2. The projector according to claim 1, further comprising the screen of the image forming system to diverge and project the image light emitted by the image forming system towards the imaging optical system,
wherein a magnification power at a point of the imaging optical system where the image light is incident and optical-path length between the optical element and the imaging optical system is short is higher than a magnification power at a point of the imaging optical system where the image light is incident and the optical-path length between the optical element and the imaging optical system is long.

3. The projector according to claim 2, further comprising a housing through which the image light reflected by the imaging optical system passes through, the housing accommodating the image forming system, the optical element, and the imaging optical system.

4. The projector according to claim 1, wherein the imaging optical system includes, in a horizontal direction, a point where the image light is incident and the optical-path length between the image forming system and the imaging optical system is short and a point where the image light is incident and the optical-path length between the image forming system and the imaging optical system is long.

5. A display system comprising:
the projector according to claim 1; and
a transmissive reflector to transmit and reflect the image light reflected by the imaging optical system,
wherein the imaging optical system projects the image light towards the transmissive reflector to form a virtual image.

6. A mobile object comprising:
the display system according to claim 5,
wherein the transmissive reflector is a front windshield that reflects the image light.

* * * * *